(12) United States Patent
Sidman

(10) Patent No.: US 8,819,410 B2
(45) Date of Patent: *Aug. 26, 2014

(54) PRIVATE ELECTRONIC INFORMATION EXCHANGE

(75) Inventor: George C. Sidman, Carmel, CA (US)

(73) Assignee: Privato Security, LLC, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/607,417

(22) Filed: Sep. 7, 2012

(65) Prior Publication Data

US 2012/0331080 A1    Dec. 27, 2012

Related U.S. Application Data

(63) Continuation of application No. 10/830,509, filed on Apr. 22, 2004, now Pat. No. 8,266,421.

(51) Int. Cl.
| | |
|---|---|
| H04L 29/06 | (2006.01) |
| H04L 9/32 | (2006.01) |
| G06F 21/00 | (2013.01) |
| G06F 11/30 | (2006.01) |
| G06F 7/04 | (2006.01) |
| G06F 17/00 | (2006.01) |
| G06F 12/14 | (2006.01) |
| H04L 9/00 | (2006.01) |
| H04L 9/08 | (2006.01) |
| H04L 9/28 | (2006.01) |
| G06F 15/16 | (2006.01) |
| G06F 15/173 | (2006.01) |

(52) U.S. Cl.
USPC ............ 713/150; 713/153; 713/161; 713/162; 713/168; 713/170; 713/171; 713/182; 713/189; 726/2; 726/11; 726/13; 726/15; 726/22; 380/259; 380/277; 380/44; 380/282; 380/28; 709/203; 709/218; 709/224; 709/227; 709/232; 709/235; 709/240

(58) Field of Classification Search
USPC ......... 713/151, 150, 153, 161, 162, 168, 170, 713/171, 182, 189; 726/2, 11, 13, 15, 22; 380/259, 277, 44, 282, 28; 709/203, 709/218, 224, 227, 232, 235, 240
See application file for complete search history.

(56) References Cited

U.S. PATENT DOCUMENTS

| | | | |
|---|---|---|---|
| 5,740,246 A | | 4/1998 | Saito |
| 5,745,904 A | * | 4/1998 | King et al. .................. 707/696 |

(Continued)

OTHER PUBLICATIONS

International Preliminary Report from PCT/US2008/072596 mailed Feb. 17, 2011; 10 pgs.

(Continued)

Primary Examiner — Aravind Moorthy
(74) Attorney, Agent, or Firm — Blakely, Sokoloff, Taylor & Zafman LLP

(57) ABSTRACT

Methods and apparatuses for private electronic information exchange are described herein. In one embodiment, when electronic information is received to be delivered to a recipient, the electronic information is transmitted over an electronic network with a private routing address. The private routing address is routable within a private domain, which is a subset of the electronic network. Other methods and apparatuses are also described.

20 Claims, 8 Drawing Sheets

(56) References Cited

U.S. PATENT DOCUMENTS

| | | | |
|---|---|---|---|
| 5,761,415 A * | 6/1998 | Joseph et al. | 709/200 |
| 6,266,420 B1 * | 7/2001 | Langford et al. | 380/282 |
| 8,266,421 B2 * | 9/2012 | Sidman | 713/150 |
| 2001/0030967 A1 * | 10/2001 | Kyusojin et al. | 370/395 |
| 2002/0199120 A1 * | 12/2002 | Schmidt | 713/201 |
| 2003/0115280 A1 * | 6/2003 | Quine et al. | 709/207 |
| 2003/0235202 A1 | 12/2003 | Van Der Zee et al. | |
| 2004/0090958 A1 * | 5/2004 | Park et al. | 370/389 |
| 2004/0249974 A1 * | 12/2004 | Alkhatib et al. | 709/245 |
| 2005/0123142 A1 | 6/2005 | Freeman et al. | |
| 2005/0138359 A1 | 6/2005 | Simon et al. | |
| 2006/0101521 A1 * | 5/2006 | Rabinovitch | 726/26 |
| 2006/0195609 A1 * | 8/2006 | Han | 709/245 |

OTHER PUBLICATIONS

International Preliminary Report from PCT/US2008/072596 mailed Nov. 11, 2008; 13 pgs.
USPTO, U.S. Appl. No. 10/830,509, Non-Final Office Action mailed Aug. 25, 2011, Whole Document.
USPTO, U.S. Appl. No. 10/830,509, Final Office Action mailed Feb. 15, 2011, Whole Document.
USPTO, U.S. Appl. No. 10/830,509, Non-Final Office Action mailed May 21, 2010, Whole Document.
USPTO, U.S. Appl. No. 10/830,509, Non-Final Office Action mailed Sep. 15, 2009, Whole Document.
USPTO, U.S. Appl. No. 10/830,509, Notice of Allowance—mailed Aug. 7, 2012, Whole Document.

* cited by examiner

US 8,819,410 B2

PRIVATE ELECTRONIC INFORMATION EXCHANGE

PRIORITY

The present patent application is a continuation of claims priority to and incorporates by reference the corresponding patent application Ser. No. 10/830,509, entitled, "Private Electronic Information Exchange", filed on Apr. 22, 2004.

FIELD OF THE INVENTION

The present invention relates generally to communications. More particularly, this invention relates to electronic information exchange using private addresses and domains.

BACKGROUND OF THE INVENTION

The Internet is over 30 years old, and is accepted as a given. TCP/IP is an accepted protocol outside of the Internet as well as a standard within it. The protocol for sending email, SMTP (simple mail transport protocol), is simple and easy to implement. The Internet's openness has made it easy to build on, easy to grow, and easy to adopt.

The Internet is a new form of commons, which is overused because it is free (marginal cost is almost zero). Everyone who has access to the Internet can communicate with everyone else who has access to the Internet. Unfortunately, the Internet's openness is also easy to exploit by malicious or vainglorious people, who want to communicate with everyone as well.

The openness of the Internet makes all communications the equivalent of postcards readable by anyone watching them go by. Encryption can disguise the postcard information, providing a strong virtual envelope for messages.

Many companies make email systems that employ encryption to keep message content private. Many of the solutions are either technically challenging to use or require users to behave differently, which has the same effect. All of these solutions succeed in making message content unreadable except by the recipient. None of these solutions make anything other than the content private.

Although making email content private does protect specific proprietary documents such as business plans, products designs, and legal and financial communications, however, making email content private does not prevent spam, viruses, or malware. The Internet as a whole is public, open, and simple. All email addresses are public even in the email systems that encrypt content.

Spam and wide distribution of viruses result when standard email addresses are public. Email addresses can be obtained by spammers or virus distributors in a variety of ways. For example, fraudsters may send email using a fake return address, a process known as spoofing. They sometimes include legitimate-appearing URLs (Uniform Resource Locators) to direct recipients to the web site of a known organization, while the actual URL that is hidden in the HTML (hypertext mark-up language) code is to a different address. Fraudsters effectively make themselves anonymous, and they include false links in an attempt to obtain personal information.

Others have attempted to keep email addresses private. This is to require that all messages be sent and received via an encrypted (e.g., SSL or secure socket layer) web browser connection to a particular server farm. This is known as a "pull" email system to which users have to log in to receive their email. This works if the recipient already has an email account with this "pull" email system.

However, if a user uses an email client to receive email, a so-called "push" system, the addresses must become public to reach that user. This can be countered with a solely-web-based email system, where all communication between the user and the web site is via SSL, an encrypted link. However, when an email is sent to a user who doesn't have an account on a web-based system, an email must be sent via normal channels to an email client which makes the email address public. Even when the user does have a web-based email account, which a user must remember to check periodically, email can lie in his/her inbox unread for an undetermined length of time, rendering the email worthless if it has a time value.

For example, a typical ABC company sells power tools on its web site and customers buy products on the web site, entrusting their personal information such as name, address, email address, credit card numbers, etc. to the ABC company. After customers buy via the web site, the ABC company sends a confirmation email to customers verifying what they just bought. The ABC company follows up later with shipping information, post-sales information, and marketing information about products in which customers might have a future interest. All these emails travel over the public Internet in a clear form, with neither content nor addresses private.

Most secure email solutions encrypt the content of emails. However, in the case of the ABC company, the content is not the part of the email that is sensitive (unless the credit card is reprinted in full, an unlikely event). Rather, the address of the email is. Fraudsters can steal email addresses and dress up the email content to appear as if it came from the ABC company, and ask customers to "verify their account information." That is, they effectively ask customers to send the fraudster their names, addresses, credit card numbers, mother's maiden name, etc., while customers think they are sending this information to the ABC company.

SUMMARY OF THE INVENTION

Methods and apparatuses for private electronic information exchange are described herein. In one embodiment, when electronic information is received to be delivered to a recipient, the electronic information is transmitted over an electronic network with a private routing address. The private routing address is routable within a private domain, which is a subset of the electronic network. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
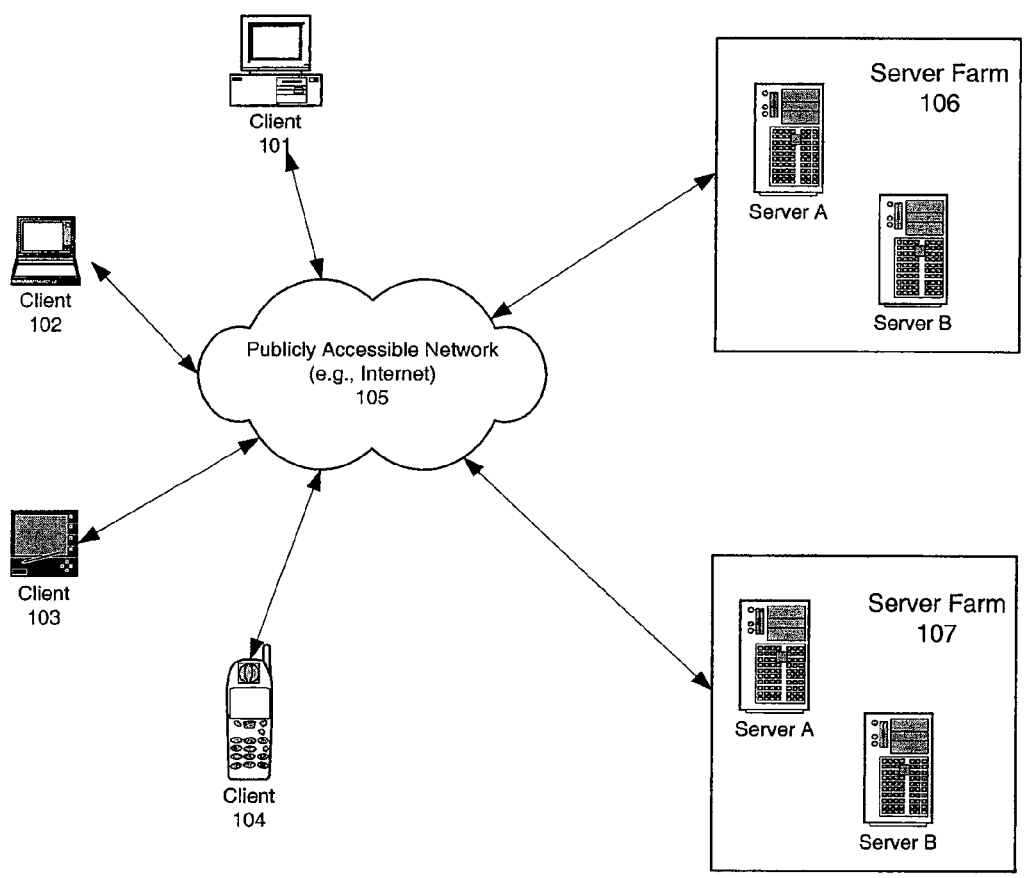
FIG. 1 is a block diagram illustrating an exemplary computer network.

Methods and apparatuses for private electronic information (e.g., email messages) exchange are described herein. In one embodiment, a method and system is provided using private domain addresses to route information over a private domain within electronic networks such as the Internet. Electronic information in this private domain will not route outside of the private domain. In one embodiment, electronic information outside the private domain will not route inside the private domain. The private domain addresses may have, but not be limited to, the formats of current Internet addresses. However, in any case, they may be made public and still remain unroutable outside the private domain. In another embodiment, a variety of encryption techniques are used to encode private routing information within the private domain. In a further embodiment, some public addresses may be routable in the private domain.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic disks, magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

According to one embodiment, private domain (e.g., private network) addresses are used to define users in a private domain, also referred to as a private network community, a community that is more immune to spam, viruses, and other malware. In one embodiment, a variety of encryption mechanisms, such as, for example, RSA technologies, PGP (pretty good privacy) key pairs, etc., may be used to encrypt some or all parts of messages to make the messages invisible to an electronic network, such as a publicly accessible network (e.g., Internet). In one embodiment, the addresses and other information are encrypted such that almost everything in a message is private, not just the contents contrary to a conventional approach. The effect is to create a private domain among users within the electronic network, similar to how a gated community creates privacy in a physical world.

In one embodiment, the encryption is performed at or near an application level of the OSI (open system interconnection) model, making the processes transparent to the type of client, such as, for example, PC (personal computer), PDA (personal digital assistant), cellular phone, Outlook from Microsoft, Lotus Notes from IBM, etc., and type of connection to the Internet, such as, for example, POTS (plain old telephone service), DSL (digital subscriber line), cable modem, wireless communication device (e.g., IEEE 802.11 compatible device). Encryption at this level also makes electronic information routable through the electronic network (e.g., Internet) as easily as unencrypted messages.

For the purposes of illustrations, an electronic message, such as an email message, is used as an example of electronic information throughout this application. However, it will be appreciated that the electronic information is not limited to the email messages, and the present invention applies to other types of data, such as, for example, Web pages, bits, bytes, packets, files, and multimedia data (e.g., streaming video), etc.

Messages created with the above techniques are difficult to spoof (e.g., via insertion of false address), which provides significant protection against viruses and spam. Encryption makes the messages nearly impossible to "sniff," a kind of network wire-tapping. As a result, the above techniques take at least a portion of the publicly accessible network private. For the purposes of illustration, a publicly accessible network is referred herein as Internet. However, the publicly accessible network is not limited to the Internet. It will be appreciated that the publicly accessible network may also refer to other types of networks, such as, for example, Value Added Networks.

In one embodiment, the email addresses are not standard email addresses used in the publicly accessible network, such as the Internet. The Internet does not recognize and is unable to route them without the techniques of the embodiments of the present invention. For example, email addresses may be printed on business cards and letterhead, yet will be useless to spammers or virus distributors. Embodiments of the invention provides private email, including private content and private addresses, to anyone who creates an account, and offers easy-to-setup accounts to anyone new who is sent an email created using the techniques of embodiments of the invention.

Exemplary Computer Network

FIG. 1 is a block diagram illustrating an example of a topology of a system. In one embodiment, the exemplary system 100 includes, but is not limited to, a variety of clients, such as, for example, personal computers 101, workstations, laptop computers, or tablets 102, personal digital assistants 103, cellular phone 104, or any computerized device capable of running software and being connected to a network. These clients may be connected to the Internet 105 to exchange electronic information, such as email messages, with the server farms 106 and 107.

The server farms 106 and 107 may include one or more computer servers, which may be housed in one or more physical servers depending on load and other local factors. The servers contain databases that hold subscriber information, recipient information, message information, and documents.

It will be appreciated that the term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art. It will be also appreciated that such system may be implemented in an Intranet within an organization.

Access to the Internet 105 is typically provided by Internet Service Providers (ISPs). Users on client systems, such as the client computer systems 101-104, generally obtain access to the Internet through ISPs. Access to the Internet may facilitate transfer of information (e.g., email, text files, media files, etc.) between two or more digital processing systems, such as the client computer systems 101-104 and/or a Web server system, such as server farms 106 and 107. For example, one or more of the client computer systems 101-104 and/or the servers 106-107 may exchange electronic messages (e.g., email messages) to one or more of the client computer systems 101-104 and/or servers 106-107.

For example, in one embodiment, one or more client computer systems 101-104 may request to transmit and/or receive an electronic message to and/or from a remote location, such as the servers 106-107. The server farms 106-107 typically includes at least one computer system to operate with one or more data communication protocols, such as the protocols of the World Wide Web (WWW), and as such, is typically coupled to the Internet 105. Optionally, the server farms (also referred to here as servers) 106-107 may be part of an ISP which may provide access to the Internet and/or other network(s) for client computer systems. The client computer systems 101-104 may each, with appropriate Web browsing software, access data, such as HTML document (e.g., Web pages), which may be provided by the servers 106-107.

An ISP, which may be implemented within server farms 106-107, provides Internet connectivity to the client computer systems 101-104 via a communication interface, which may be considered as part of the client computer systems 101-104. The client computer systems 101-104 may be a conventional data processing system, such as a Macintosh computer available from Apple Computer, Inc. or an IBM compatible PC, a "network" computer, a handheld/portable computer, a cell phone with data processing capabilities, a Web TV system, or other types of digital processing systems capable of networking (e.g., a personal digital assistant (PDA), a card reader, a UPC scanner, an RFID reader, etc.).

However, it will be appreciated that the connectivity may vary between various client computer systems, such as the client computer systems 101-104. For example, the client computer system 101 may be coupled to the Internet 105 through a modem interface, while client computer system 102 may be part of a local area network (LAN). The communication interface clients 101-104 may be an analog modem, an ISDN modem, a DSL modem, a cable modem, a wireless interface, or other interface for coupling a digital processing system, such as a client computer system, to another digital processing system.

For example, the client computer systems 101-104 may be coupled to a LAN (not shown) through the respective network interfaces. The network interface may be an Ethernet-type, asynchronous transfer mode (ATM), or other type of network interface. The LAN may also be coupled to a gateway digital processing system, which may provide firewall and other Internet-related services for a LAN. The gateway digital processing system, in turn, may be coupled to an ISP to provide Internet connectivity to the client computer systems 101-104. The gateway digital processing system may, for example, include a conventional server computer system. Similarly, the server farms 106-107 may, for example, include a conventional server computer system.

Client computers 101-104 may be able to send and receive email messages from each other. The email systems used by client computers 101-104 may be proprietary email systems, such as IBM Lotus Notes. Alternatively, the email systems used by the client computers may be standard email systems, such as email systems using POP3 (post office protocol 3), SMTP (simple mail transport protocol), or IMAP (Internet message access protocol) protocols.

According to one embodiment, an email client running at the client computers 101-104 may use an Internet unroutable address as a sender address and/or a recipient address to exchange email messages with each other. As a result, even if a spammer obtains an email address of a client, the spammer cannot send a spam message to the client using the client's email address, which is unroutable in the Internet without the techniques of the embodiments of the invention.

In one embodiment, the address includes a first portion and a second portion. The first portion may be compatible with a standard email address that is publicly routable in the Internet, while the second portion is privately recognizable that enables routing within a private network or private network community. Therefore, the address as a whole cannot be routed through the Internet without using the techniques of the embodiments of the invention.

In one embodiment, the private domain (e.g., private network) may be hosted by a dedicated server such as server farms 106 and 107. In order to send an email using the address that is privately routable, the sender has to be a subscriber of the private network. For example, if client 101 wants to send an email using its privately routable address, client 101 has to be a member of a private network hosted by server farms 106 and/or 107. Client 101 has to log into at least one of the servers in server farms 106 and 107 prior to sending an email to a recipient, which may be one of the other clients 102-104. In one embodiment, clients 101-104 are coupled to server farms 106 and 107 via one or more secure connections using a variety of protocols, such as, for example, SSL (secure socket layer) protocols.

According to one embodiment, in order to send an email message through the private domain, the sender has to subscribe to the private domain. When the sender wishes to send an email to a recipient having a recipient email address, the sender logs in to the private domain. Once a server of the private domain successfully authenticates the sender, the sender encrypts at least a portion of the email message including the recipient's email address and sends the encrypted email message to a server of the private domain, using a communication protocol associated with the network, such as, for example, TCP/IP protocol. The encrypted email message is stored in one or more locations of the private domain, where the stored email message may be retrieved by the recipient subsequently.

In one embodiment, the email message is encrypted using a variety of encryption techniques. In a particular embodiment, the email message is encrypted using a symmetrical key created specifically for that email message. That is, each email message is encrypted using a distinctive symmetrical key. As a result, even if an attacker obtained the symmetrical key, the attacker cannot use the same symmetrical key to attack other messages. After the email message has been encrypted using the symmetrical key, the symmetrical key may be further encrypted to form a security package using a public key of a key pair associated with the recipient, where the recipient retains the corresponding private key. The public key may be received by the sender from a server of the private domain, once the sender successfully logs in into the private domain.

When a server of the private domain receives the encrypted email message, the server of the private domain may examine an internal record to determine whether the recipient is a member of the private domain. The encrypted email message may be stored in one or more locations accessible by the recipient. Thereafter, the server of the private domain sends a notification to the recipient to notify the recipient that an email message is waiting to be retrieved. Alternatively, the recipient may pull the email message from the server without notification from the server.

If the recipient is not a member of the private domain, according to one embodiment, the server temporarily creates an account for the recipient and stores the security package in one or more locations temporarily allocated for the recipient. Thereafter, a server of the private domain sends a notification message to the email address of the recipient (e.g., a standard email addressed to the standard email address of the recipient) to notify the recipient that an email message is waiting in the private domain to be downloaded.

In addition, according to one embodiment, the notification further provides a mechanism, such as, for example, a link, from which the recipient can download the necessary application software to enable the recipient to download the email message from the private domain. In one embodiment, the application software enables the recipient to create a cryptographic public and private key pair. The public key is used to re-encrypt the symmetric key after being unencrypted by the temporary private key.

Once the server receives the public key from the recipient, the server may send the public key to senders to allow senders to encrypt their symmetrical keys for each recipient. The recipient then can use the private key to decrypt the encrypted symmetrical key and use the symmetrical key to decrypt the encrypted electronic information in order to recover the original version of the electronic information.

Furthermore, according to one embodiment, the notification and/or the downloaded application software may further include information to invite the recipient to subscribe to the private domain in order to enable the recipient to send messages through the private domain.

In a further embodiment, the identity of a sender may be tracked by the server such that the message sent by a sender can be traced by either the recipient or the server, contrary to a conventional spammer's untraceable address. Alternatively, the sender's email address may be untraceable by the recipient, but is traceable by the private network (e.g., an administrator of the private network. As a result, a sender who sends a spam email (e.g. with a virus) may be tracked down by the private network.

Exemplary Electronic Messaging Configurations

Figure 2:
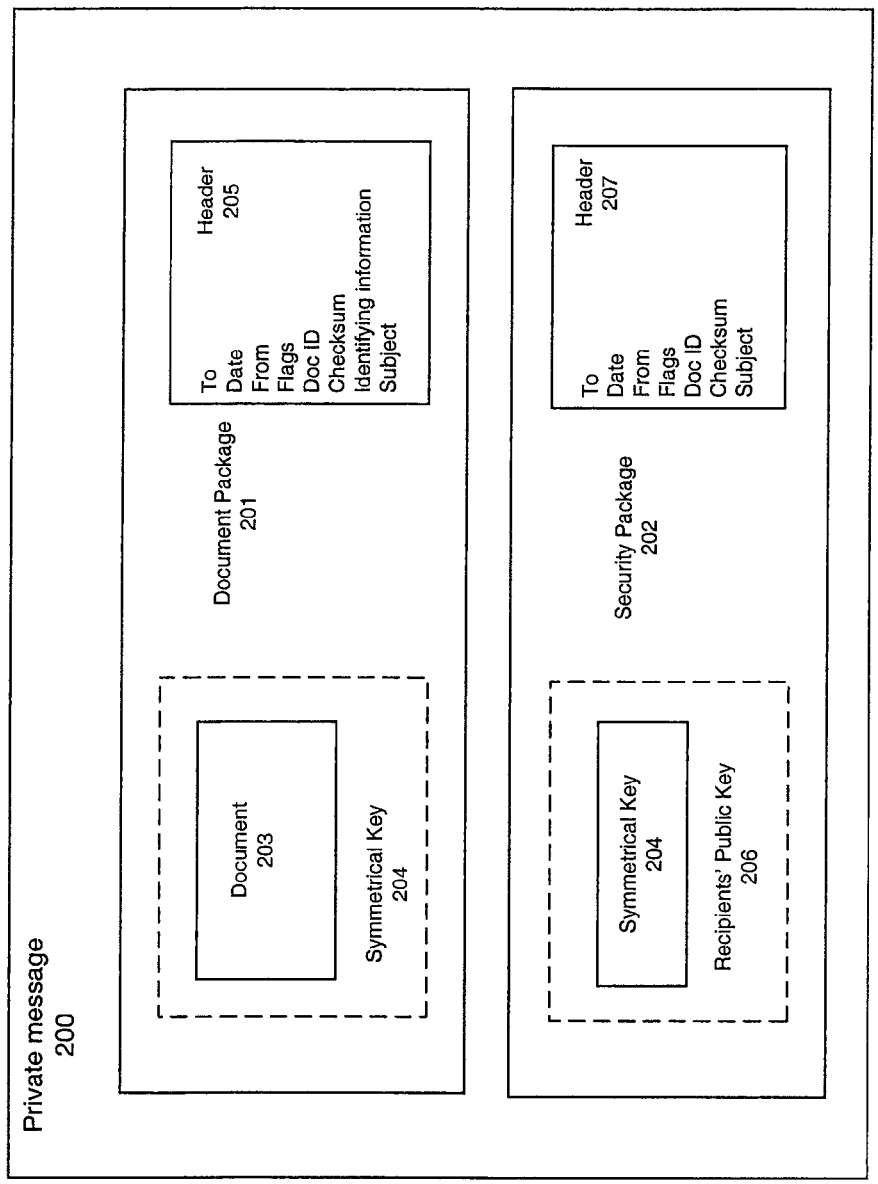
FIG. 2 is a block diagram illustrating an exemplary electronic message.

FIG. 2 is a block diagram illustrating an example of a structure of an electronic message. In one embodiment, exemplary electronic message 200 includes a document package 201 and a security package 202. The document package 201 includes, but not limited to, document 203 that may be encrypted by a symmetrical key 204 using a variety of encryption techniques and a header 205 for describing one or more properties of the document package 201. Document 203 may include at least a portion of the message body of an electronic message, including any attachments of the message. Header 205 may be generated based on the message header of the electronic message (e.g., email header). Header 205 may include addresses of the sender and recipient, which may include the first and second portions described above. In one embodiment, symmetrical key 204 is generated by the sender of document 203 and it is generated specifically for document 203.

In one embodiment, security package 202 includes, but is not limited to, symmetrical key 204, which encrypts document 203 within document package 201, encrypted by a public key 206 of the recipient intended to receive the electronic message. Security package 202 further includes a header 207 containing one or more properties of security package 202. Header 207 may include addresses of the sender and recipient, which may include the first and second portions described above. Header 207 may be generated based on the message header of the electronic message (e.g., email header).

In one embodiment, at least one of the document package 201 and security package 202 may be stored in a server, such as server farms 106 and 107 of FIG. 1. The document package 201 and security package 202 may be retrieved subsequently by the recipient to obtain document 203. In one embodiment, the recipient retrieves security package 202 from the server and recovers the symmetrical key 204 using a private key of the recipient. Thereafter, the recipient may use the recovered symmetrical key to decrypt the encrypted document 203 to recover the original document 203 (e.g., the electronic message in plain text).

Figure 3:
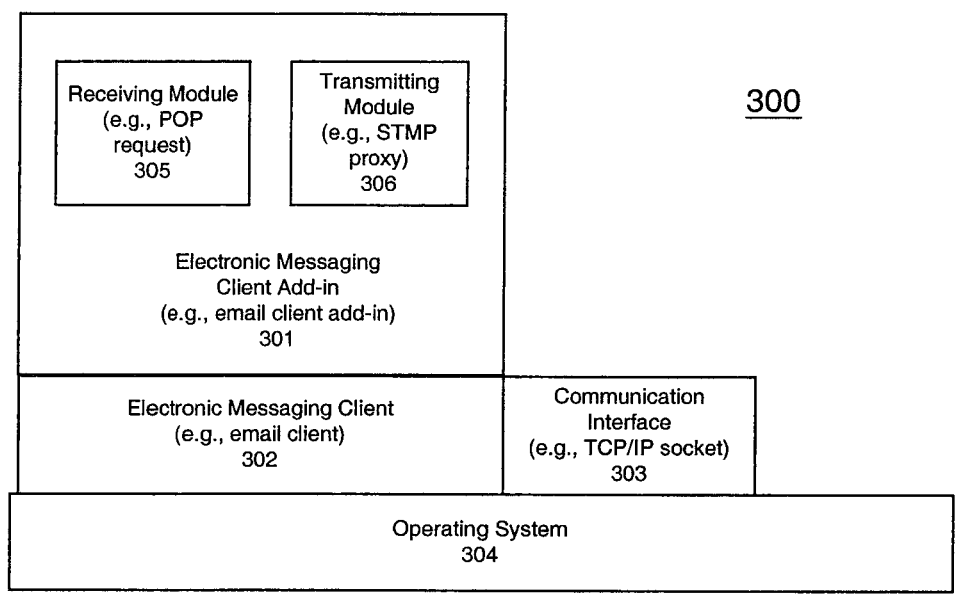
FIG. 3 is a block diagram illustrating an exemplary software architecture.

FIG. 3 is a block diagram illustrating an example of software architecture embodiment. Exemplary architecture 300 may be implemented within a client, such as clients 101-104 of FIG. 1. In one embodiment, exemplary architecture 300 includes, but not limited to, electronic messaging client add-in 301, electronic messaging client 302, communication interface 303, and an operating system (OS) 304.

In one embodiment, electronic messaging client 302 may be an email client of an email program from a variety of vendors, such as, for example, Outlook from Microsoft and Lotus Notes from IBM. Electronic messaging client add-in 301 may be an extension of the electronic messaging client 302 (e.g., a plug-in component). Alternatively, electronic messaging client add-in 301 may be implemented as a part of electronic messaging client 302. Furthermore, electronic messaging client add-in 301 may be implemented as a part of OS 304 and/or communication interface 303.

In one embodiment, the electronic messaging client add-in includes, but not limited to, a receiving module 305 and a transmitting module 306. The receiving module is responsible for receiving electronic messages, while the transmitting module 306 is responsible for transmitting electronic messages.

In one embodiment, the electronic messaging client add-in 301 handles most of the address processes, such as, for example, processing the first and second portions of the sender and/or recipient addresses mentioned above. The electronic messaging client add-in 301 communicates with the electronic messaging client 302, which is largely transparent to a user of the electronic messaging client 302.

For the purposes of illustrations, electronic messaging client 302 and electronic messaging client add-in 301 may be referred to as an email client and an email client add-in throughout the application. However, it will be appreciated that electronic messaging client 302 and electronic messaging client add-in 301 are not limited to the email client and email client add-in. Other messaging systems, such as, for example, an instant messaging (IM) system and a SMS (short message service) of a wireless network, may be applied.

In one embodiment, communication interface 303 may be a TCP/IP (transport control protocol/Internet protocol) socket interface. Communication interface 303 enables the email client 302 and email client add-in 301 to communicate with other clients over a network (e.g., Internet). Communication interface 303 may be implemented as a part of a network stack of OS 304. Alternatively, communication interface 303 may be implemented within the email client add-in 301 and/or email client 302.

OS 304 may be an operating system from a variety of vendors. For example, OS 304 may be a Windows operating system from Microsoft or a Mac OS from Apple Computer. Alternatively, OS 304 may be a Unix or Linux operating system. Other operating systems, such as, a Palm OS, or other embedded or real-time operating systems may be implemented.

Exemplary Electronic Messaging Addresses

Figure 4A:
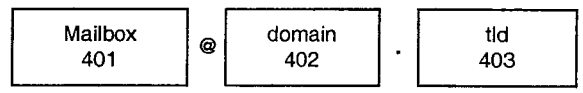
FIGS. 4A and 4B are block diagram illustrating examples of addresses.

FIG. 4A is a block diagram illustrating an example of a typical email address. The email address 400 typically includes a mailbox name 401 which is often a person's name, followed by an "@" sign, followed by a domain 402. Domains can have simple names such as "yahoo" or more complicated names such as "my.yahoo." The domain 402 is followed by a "dot" and then a top level domain (TLD) 403 such as ".com" or ".ca", etc.

Figure 4B:

FIG. 4B is a block diagram illustrating an example of a private email address according to one embodiment. Similar to email address 400, exemplary private email address 450 includes a mailbox name 401. It is followed by an "@" sign and a domain name 402, a "dot," and a TLD 403. In addition, according to one embodiment, the exemplary address 450 further includes another "dot" and a private top level domain (PTLD) 404, such as, for example, "loq". In one embodiment, a PTLD 404 may be used without a TLD 403.

In one embodiment, the exemplary private email address 450 can be any string of digits, as long as the server farms and email client add-ins (e.g., email client add-in 301 of FIG. 3) can understand how to route private email address 450.

In one embodiment, private email address 450 is not routable over the open Internet, as industry standard TLDs are registered and controlled by an industry governing body, and the PTLD is not a part of the registered set. Consequently, the routing equipment and software of the open Internet (e.g., domain name servers) will not recognize the PLTD, denying its access for movement on the open Internet. According to one embodiment, software such as an email client add-in 301 of FIG. 3 and a server farm (e.g., server farms 106 and 107) may be required to route the PTLD. In one embodiment, this is accomplished by domain name server methods within the server farms. Much like traditional domain name servers, the server farms match private addresses on the private network with their underlying public addresses (e.g., IP addresses). Thus the email address (e.g., private email address 450) can be printed on business cards yet cannot be spammed or sent anonymous email. The sender may be required to have an account in the private network in order to send and/or receive emails using the private email address 450. It will be appreciated that the above techniques may be applied to all Internet addresses (e.g. Uniform Resource Identifiers [URIs]) that are not email addresses, such as, for example, Web addresses.

Exemplary Electronic Messages

Figure 5:
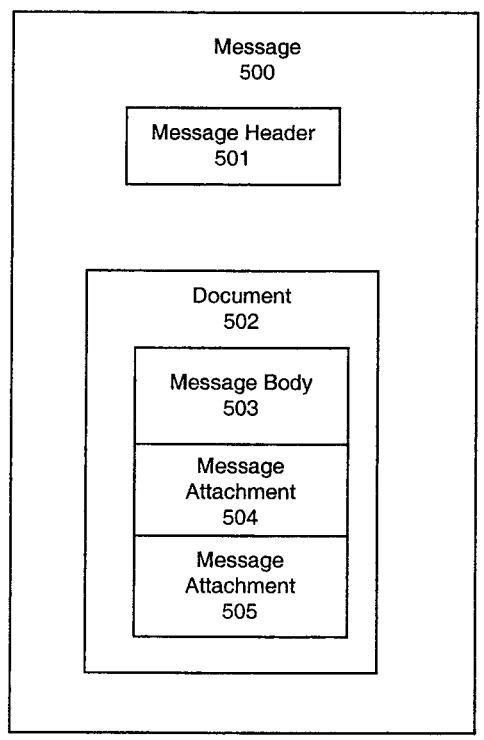
FIG. 5 is a block diagram illustrating an example of an electronic message.

FIG. 5 is a block diagram illustrating an exemplary structure of an electronic message. In one embodiment, exemplary electronic message 500 includes, but is not limited to, message header 501 and document 502. Message header 501 may include information regarding the document 502. For example, message header 501 may include identities of a sender and a recipient, such as the sender address and the recipient address. In one embodiment, at least one of the sender and the recipient addresses includes a first portion, which is typically an identifier for an individual or account, and a second portion that enables routing in a private network or community. Message header 501 may further include other properties similar those of an ordinary electronic message, such as, for example, a checksum value for verifying integrity of document 502 and/or a document ID for document 502. Document 502 may include a message body 503 and one or more attachments 504 and 505.

Exemplary Processes For Sending Electronic Messages

Figure 6:
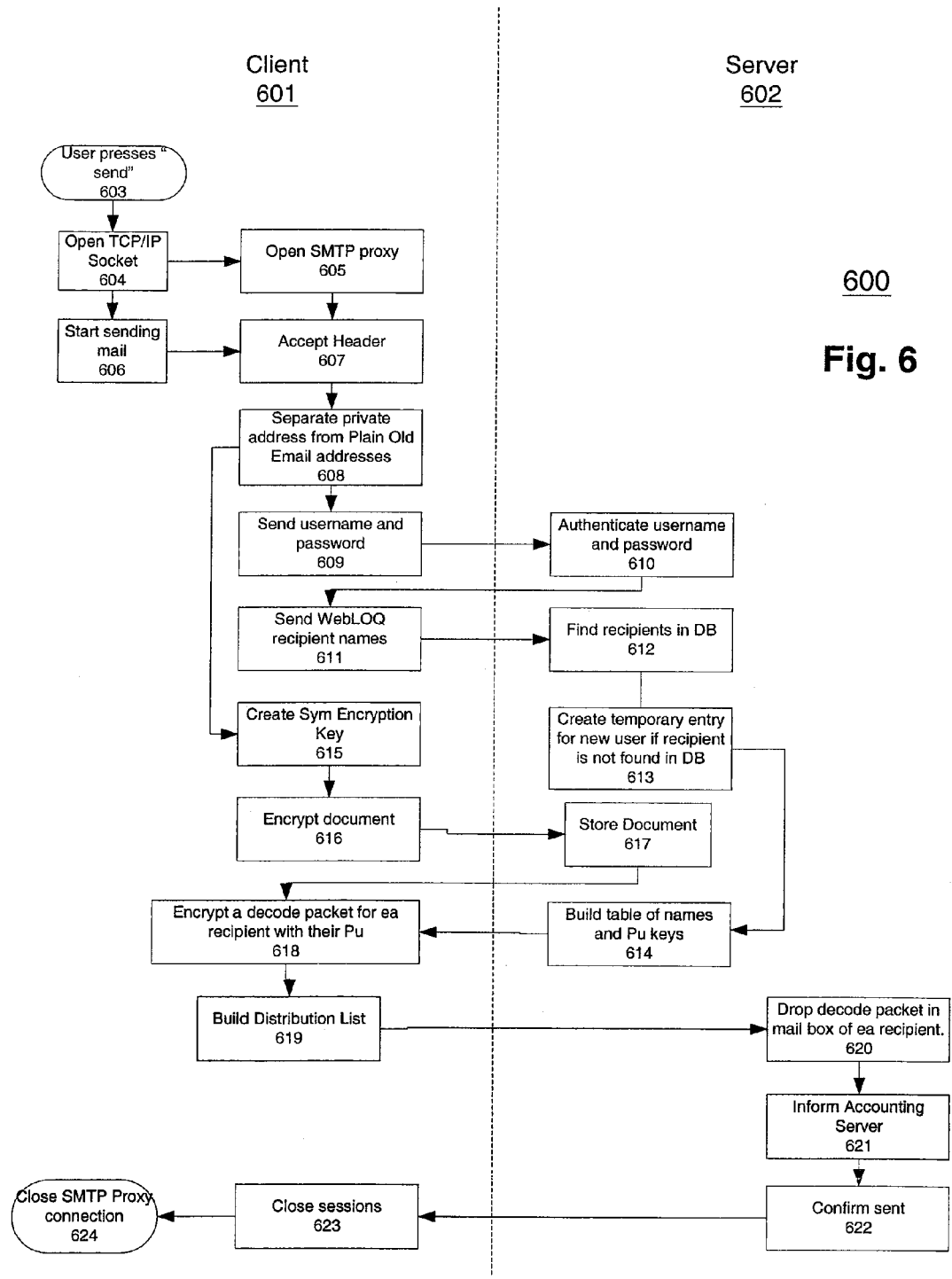
FIG. 6 is a flow diagram illustrating one embodiment of a process for transmitting an electronic message.

FIG. 6 is a flow diagram illustrating an exemplary process for transmitting an electronic message. Exemplary process 600 may be performed by a processing logic that may comprise hardware (circuitry, dedicated logic, etc.), software (such as is run on a dedicated machine), or a combination of both. For example, exemplary process may performed by an email client and/or an email client add-in (e.g., email client 302 and/or email add-in 301 of FIG. 3) of a client 601, such as clients 101-104 of FIG. 1, communicatively coupled to a server 602, such as server farms 106-107 of FIG. 1.

Referring to FIGS. 3 and 6, at block 603, the user presses "Send" in their email client 302. The action opens a new TCP/IP socket connection (using communication interface 303) at block 604. At block 605, the processing logic opens a SMTP proxy server process 306 that runs in the email client add-in 301. In one embodiment, the email client add-in 301 will perform at least three encryptions in the course of sending a message (e.g., message 500) to a server (e.g., server farm 106 and 107 of FIG. 1) including the secure connection with the server.

In one embodiment, a temporary public/private key pair is maintained within the server farms 106 and 107 when a recipient is not yet a member of the private network. The public key of the temporary public/private key pair maintained by the server may be used by a sender to temporarily encrypt the symmetric key. In addition, each of the recipients that are members of the private network may maintain a public/private key pair on clients 101-104, where the public key of the recipients is also stored in the server. When a recipient becomes a member of the private network, the new public key will be used to re-encrypt the symmetric key at the server after being unencrypted by the temporary private key.

Furthermore, a symmetric key may be created every time a sender is transmitting an electronic message and may be used to encrypt at least a portion of the electronic message. That is, each electronic message transmitted through the private domain may be encrypted using a distinctive symmetric key specifically created for that email message.

At block 606, the email client 302 starts sending the message to the email client add-in 301. At block 607, the email client add-in begins by accepting the header information (e.g., message header 501) from the email client, such as, for example, "To," "From," "Subject," date, and email flags, and gathering other information such as checksum, document ID, and identifying information, etc. This information may be used to create modifications of the message header (e.g., headers 205 and 207 of FIG. 2). In one embodiment, this identifying information makes clear to the recipient which subscriber is sending the message. It is possible to create a similar system where the subscriber is anonymous to the recipient.

At block 608, the email client add-in may take the header information and separates the private addresses (e.g., address 450 (e.g., a string of characters) of FIG. 4B) from those that are standard email addresses (e.g., address 400 of FIG. 4A). The email client add-in may route the message intended for standard email addresses to the public Internet without modification. At block 609, the email client add-in initiates a network connection with the server farm and sends the identifying information (e.g., username and password) of the user to the server farm for authentication. In another embodiment, some or all email addresses including standard email addresses may be routed through server farms 106-107 enabling those addresses properly registered as aliases during the subscription process to be routed in the private domain. In one embodiment, the network connection is a secure (e.g., encrypted) connection, such as, for example, an SSL connection.

At block 610, the server authenticates the user by accessing a database to determine whether the user has subscribed to the private domain hosted by the server. If the server farm finds the identifying information (e.g., username and password) in the database, the server returns a successful status to the client. At block 611, the identity of the recipients is sent to the server. In one embodiment, the private addresses (e.g., address 450 of FIG. 4B) in the recipient list (from message header 501 of FIG. 5) are sent over a secure connection to the server.

At block 612, the server accesses a database to identify the recipient or recipients of the electronic message. In one embodiment, the identity of the recipient may be a private address such as address 450 of FIG. 4B. In one embodiment, the server tries to locate the public keys for all recipients for a message in its user database. At block 613, if the identity of the recipient is not found in the user database (e.g., not a member of the private domain), the server creates a temporary private/public key pair for the intended recipient. The temporary public key may be used in place of a member recipient's public key for non-member recipients. There may be two levels of subscription. One is for recipients so that they may receive private email. A more restricted level may be used for senders. The latter is referred to herein as "subscription" and the former is referred to herein as "becoming a member of the private domain."

At block 614, the server creates a table of recipient identifiers, including both members and non-members, and their public keys. All public keys of the recipients are sent to the email client add-in over the secure connection.

Meanwhile, at block 615, after the email client add-in finished sending the email addresses of the recipients to the server at block 609, the email client add-in creates a unique symmetric key specifically for the electronic message being sent. In one embodiment, the symmetric key is created at runtime for the respective message, such that each message sent has a different and unique symmetric key.

At block 616, at least a portion of the document (e.g., document 500 of FIG. 5), which includes the mail message body and any attachments, is encrypted with the symmetrical key, resulting in an encrypted document. The encrypted document is combined with document header 205 to make document package 201 and sent over the network connection to the server to be stored at block 617. It will subsequently be retrieved when a recipient requests his/her mail.

At block 618, the email client add-in uses each recipient's public key to encrypt a copy of the symmetrical key. In one embodiment, a unique symmetrical key is used for each message and each recipient has a uniquely encrypted version of the symmetrical key for the respective message. When the recipient retrieves his or her email from the server, the recipient decrypts the encrypted symmetrical key with his/her private key, and thereafter decrypts the document using the symmetrical key. The email client add-in then combines the encrypted symmetrical key with a modification of the message header information (header 207) to make security package 202. The modification may include more information than contained in message header 501 of the email message as created in the email client, including for example a document ID.

At block 619, a distribution list is generated based on the addresses of the intended recipients with their corresponding security packages. The security packages are then sent over the network connection to the server. At block 620, the security packages are stored in the server for each recipient. Note that the security package still includes a symmetric key encrypted by the recipient's public key. No message, nor the symmetric key used to encrypt them, is kept unencrypted in the server.

At block 621, the statistical information regarding the message sent by the sender is logged and stored on the server. As described above, a sender has to be a member of the private network in order to send an electronic message through the private network. In one embodiment, a number of the electronic messages that a sender is able to send may be dependent upon a cost of the subscription. For a given type of subscription, a number of electronic messages that a sender can send may be limited to a predetermined threshold associated with the respective subscription.

At block 622, the server sends a message over the network connection to inform or acknowledge the email client add-in that the message has been sent. At block 623, the email client add-in sends the email client and/or the server a message that the message has been sent. At block 624, the email client closes the SMTP proxy connection to the email client add-in. Other operations apparent to those with ordinary skill in the art may also be performed.

Furthermore, the server of the private domain sends a notification to the recipient to notify the recipient that an email message is waiting to be retrieved. Alternatively, the recipient may pull the email message from the server without notification from the server.

If the recipient is not a member of the private domain, according to one embodiment, a server of the private domain sends a notification message to the email address of the recipient (e.g., a standard email addressed to the standard email address of the recipient) to notify the recipient that an email message is waiting to be downloaded from the private domain.

In addition, according to one embodiment, the notification further provides a mechanism, such as, for example, a link, from which the recipient can download the necessary application software to enable the recipient to receive the email message from the private domain.

Furthermore, according to one embodiment, the notification and/or the downloaded application software may further include information to invite the recipient to subscribe to the private domain in order to enable the recipient to send messages through the private domain.

Exemplary Processes for Receiving Electronic Messages

Figure 7:
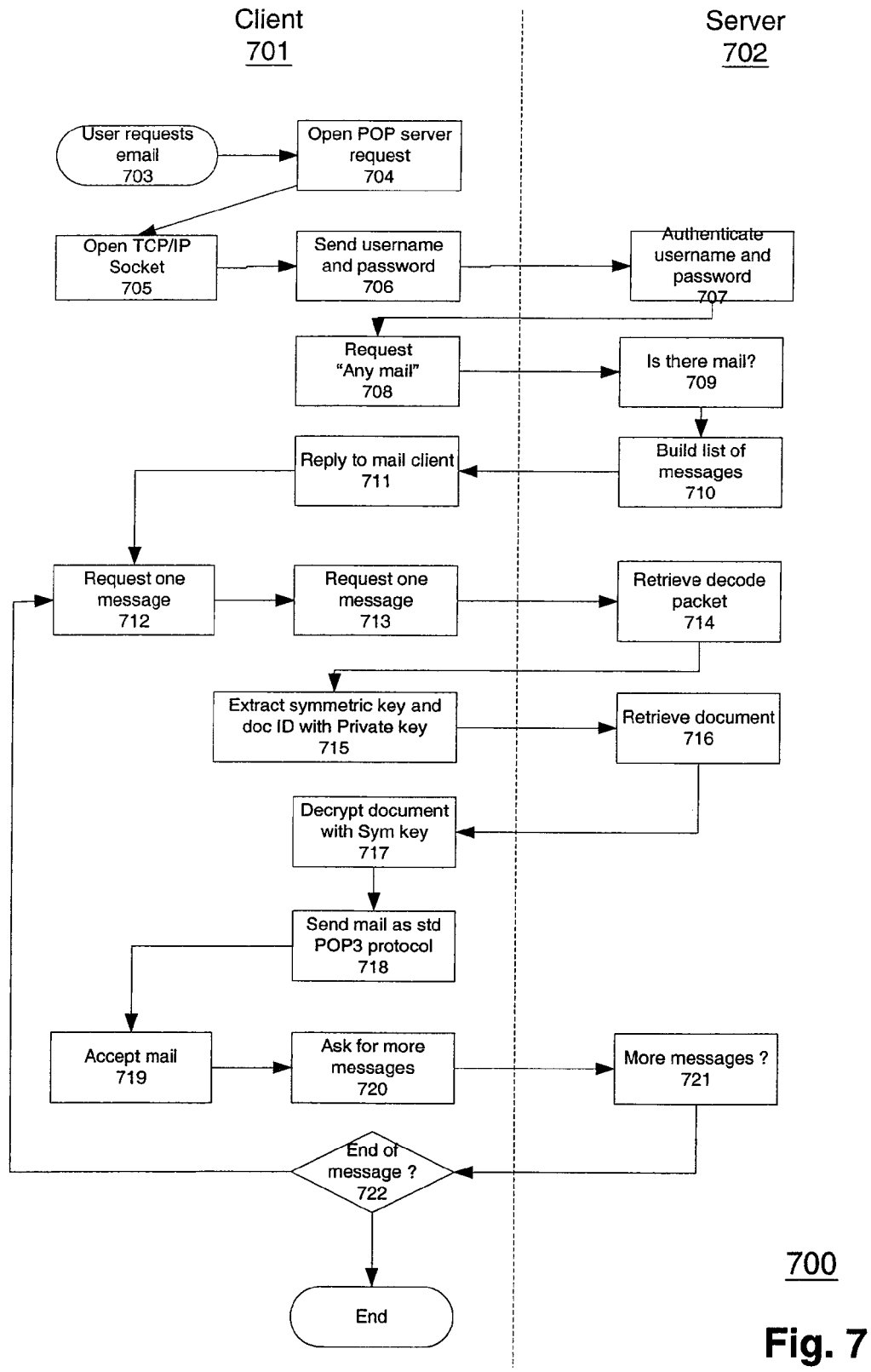
FIG. 7 is a flow diagram illustrating one embodiment of a process for receiving an electronic message.

FIG. 7 is a flow diagram illustrating an exemplary process for receiving an electronic message. Exemplary process 700 may be performed by a processing logic that may comprise hardware (circuitry, dedicated logic, etc.), software (such as is run on a dedicated machine), or a combination of both. For example, exemplary process 700 may be performed by an email client and/or an email client add-in (e.g., email client 302 and/or email add-in 301 of FIG. 3) of a client 701, such as clients 101-104 of FIG. 1, communicatively coupled to a server 702, such as server farms 106-107 of FIG. 1.

Referring to FIGS. 3 and 7, at block 703, a user clicks "receive" in the email client 302 to download his or her email messages from server 702. At block 704, the email client add-in 301 opens a POP or an IMAP server request. At block 705, the server request opens a TCP/IP socket (e.g., TCP/IP socket 303), which initiates a network connection with the server 702. In one embodiment, the network connection is a secure network connection, such as an SSL secure connection.

At block 706, the email client add-in 301 sends identifying information (.e.g. username and password) of the recipient to the server 702 for authentication over the network connection. At block 707, the server 702 performs an authentication by checking a user database to see if there is a match with stored identifying information (e.g. usernames and passwords). In one embodiment, a check may be made as to whether the machine signature matches. Furthermore, other checks besides username and password may be made.

At block 708, once the recipient is authenticated, the email client add-in 301 requests all mail messages from the server 702 over the network connection. At block 709, the server 702 examines the respective mailbox of the client 701 to determine whether any mail for the client 701 exists. If there is at least one mail for the client 701, at block 710, the server 702 builds a list of message identifiers. The server 702 sends this list to the email client add-in 301 of client 701 over the network connection.

At block 711, the email client add-in 301 reports to the email client 302 that there are one or more email messages. At block 712, the email client 302 asks the email client add-in 301 for the first message, which at block 713, the email client add-in 301 passes to the server 702 over the network connection. At block 714, the server retrieves the security package associated with the respective electronic message and sends the security package over the network connection to the email client add-in 301. In one embodiment, the security package may be implemented as security package 202 of FIG. 2, including the encrypted symmetrical key generated by the sender, where the symmetrical key is used to encrypt at least a portion of the electronic message.

At block 715, the email client add-in 301 decrypts the encrypted symmetrical key with the recipient's private key corresponding to the recipient public key to yield the unencrypted symmetric key. At block 716, the document package is retrieved from the server using the document ID and the document package is sent to the email client add-in 301 over the network connection.

At block 717, the encrypted document is decrypted with the symmetrical key to yield the document. At block 718, the document 203 is sent from the email client add-in 301 to the email client 302 via a standard POP or IMAP protocol. The message can then be read in the email client 302 like any standard email. At block 719, the email client 302 accepts the message, uses its user interface to display information about the message, and informs the email client add-in 301 that the message has been delivered.

At block 720, the email client add-in 301 asks the server for more messages. At block 721, the server checks to see if there are more messages for the client. At block 722, if there are more messages, the email client add-in 301 informs the email client 302 to request the next message, or alternatively, close the connection and end the session if there are no more messages to be retrieved. Other operations may be performed.

Exemplary Subscriptions

In one embodiment, a private network is designed to ensure that senders are not anonymous (although the senders could be anonymous according to other embodiments). In one embodiment, anonymity is prevented by requiring senders to subscribe to a private network community. For example, a private network community might be hosted by a server such as server farms 106 and 107 of FIG. 1 and administered by a private organization (hence "taking the Internet private"), where the decrypting of addresses would occur.

At the time of installation of the software, according to one embodiment, the email client add-in would capture a "signature" of the subscriber's machine to fix sender identity to at least one machine. This signature would be sent with every message. At the time of installation, in one embodiment, the email client add-in will also generate a public/private key pair, where a copy of the public key is sent to the administrator of the private network, and the private key is kept on the local machine (e.g., with the client). The "home" client machine can be changed later if necessary.

At the time of subscription, in one embodiment, the new sender would purchase service from the administrator, who would verify the name and address, as well as other credit card information of the new sender. The administrator would verify the new account through an existing email account. One of the purposes of these operations is to prevent sender anonymity.

According to one embodiment, recipients would not need to subscribe to receive messages from senders (which must be subscribers), but they would need to become a member of the private domain and download the email client add-in (e.g., email client add-in 301 of FIG. 3) to read messages. At the time of email client add-in installation, a private/public key pair may be created on the recipient's local machine, just as for subscribers, and a machine "signature" would also be captured, just as for subscribers. When a recipient becomes a member of the private domain, and if messages are already waiting to be received, the temporary private key is used in the server to decrypt the encrypted symmetric keys in the security packages. The new public key of the now-member recipient is used in the server to re-encrypt the symmetric keys.

Senders and recipients may be bound together by a server (e.g., server farms 106 and 107 of FIG. 1). Their addresses are readable and routable only by this server. Other servers will not understand the private addresses (e.g., address 450 of FIG. 4) created for use by this server. Therefore, a "private community" is created by the system for senders and receivers. Server farms may have tables that allow two-way communication with other private communities (e.g., peer-to-peer communities) if both communities concur. Thus "treaties" will be encouraged between server farms including the administrators of server farms.

In one embodiment, senders will not be able to send unlimited messages. An important protection of the private community is protection of senders from each other. A generous but finite limit may be set for daily email sending. The limit will vary depending on the subscription level (e.g., it will require more money to send more email), customary usage, and/or treaties, or other policies. Although a sender daily limit will not eliminate spam, however, it will severely limit it, since advertisers will be careful about how they spend their money. It will provide a soft limit to recipients much like the cost of postage places limits on direct mail.

Exemplary Data Processing System

Figure 8:
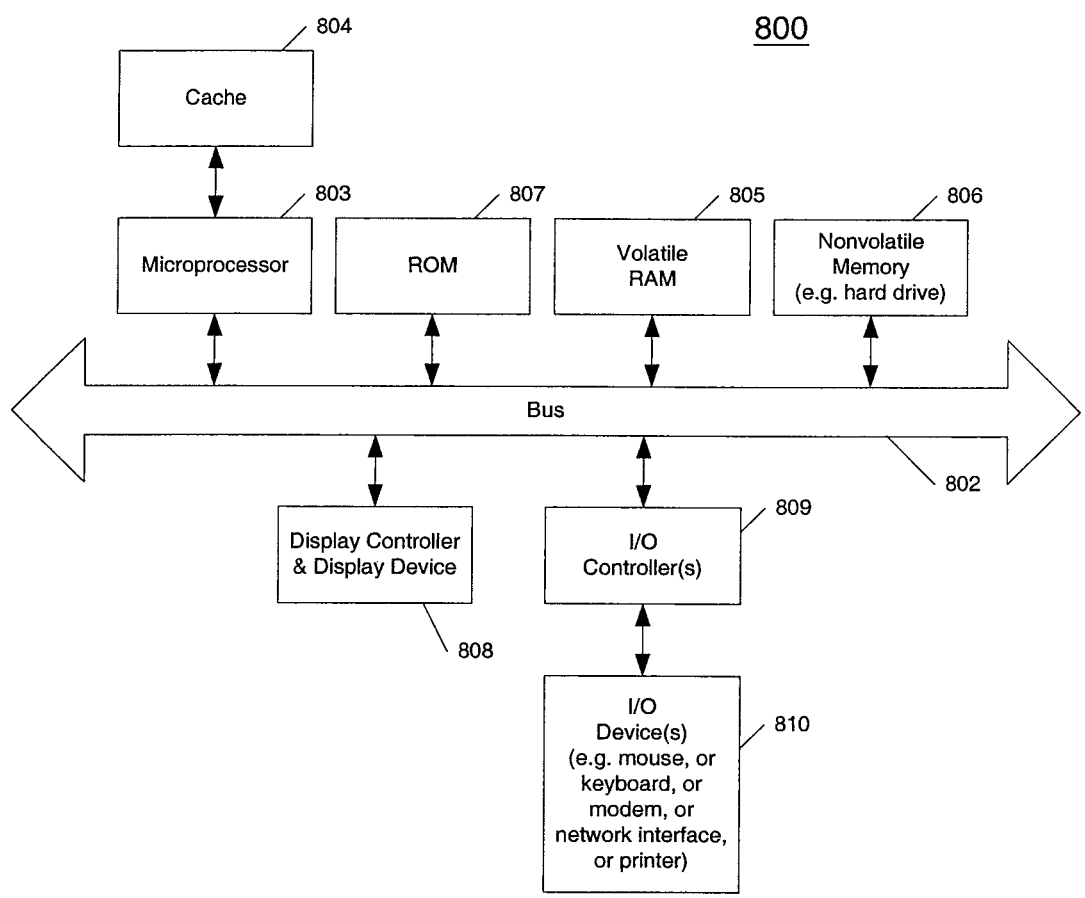
FIG. 8 is a block diagram illustrating an exemplary data processing system.

FIG. 8 is a block diagram of a digital processing system. For example, the system 800 shown in FIG. 8 may be used as a client computer system (e.g., the client computer systems 101-104 of FIG. 1), a Web server system (e.g., server farms 106 and 107), or a conventional server system, etc. Furthermore, the digital processing system 800 may be used to perform one or more functions of an Internet Service Provider.

Note that while FIG. 8 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components and may also be used with the present invention. The computer system of FIG. 8 may, for example, be an Apple Macintosh computer or an IBM compatible PC.

As shown in FIG. 8, the computer system 800, which is a form of a data processing system, includes a bus 802 which is coupled to a microprocessor 803 and a ROM 807, a volatile RAM 805, and a non-volatile memory 806. The microprocessor 803, which may be, for example, a PowerPC microprocessor from Motorola, Inc. or IBM, or alternatively, a Pentium processor from Intel Corporation, is coupled to cache memory 804 as shown in the example of FIG. 8.

The bus 802 interconnects these various components together and also interconnects these components 803, 807, 805, and 806 to a display controller and display device 808, as well as to other input/output (I/O) devices 810, which may be mice, keyboards, modems, network interfaces, printers, and other devices which are well-known in the art. Typically, the input/output devices 810 are coupled to the system through input/output controllers 809.

The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, Electrically Erasable Programmable Read-Only Memory (EEPROM), a DVD RAM or other type of memory system which maintains data even after power is removed from the system. Typically the non-volatile memory will also be a random access memory, although this is not required. In one embodiment, an email client and/or email client add-in described above may reside in volatile RAM 805 to exchange email messages using a privately routable address.

While FIG. 8 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices.

Thus, methods and apparatuses for private electronic mailing have been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   registering a sender to enable the sender to access services of a private domain in order to allow the sender to use the private domain for electronic information transmissions between members of the private domain;
   receiving, at a server associated with the private domain, data from the sender indicating that the sender is initiating the transmission of electronic information in the private domain to a recipient;
   determining, at the server associated with the private domain, whether the recipient is a member of the private domain by examining a record of members of the private domain;
   providing to the sender, from the server associated with the private domain, a public cryptographic key associated with the recipient when the recipient is determined to be a member of the private domain;
   receiving, at the server associated with the private domain, electronic information to be delivered to a recipient from the sender, the electronic information comprises at least a portion of the electronic information encrypted by a symmetric cryptographic key that is unique for the transmission of the electronic information, and wherein the electronic information further comprises a security package that contains an encrypted version of the symmetric cryptographic key, the encrypted version of the symmetric cryptographic key encrypted by the sender using the public cryptographic key of the recipient to enable the recipient to decrypt the symmetric cryptographic key and then decrypt the at least a portion of the encrypted electronic information; and
   transmitting the electronic information, with the security package, over an electronic network to the recipient.

2. The method of claim 1, wherein the electronic network is the Internet.

3. The method of claim 1, wherein the electronic network is a publicly accessible network.

4. The method of claim 1, wherein the electronic information is an electronic mail message.

5. The method of claim 1, wherein the format of the private routing address contains one or more characters that are discretionarily selectable by an administrator of the private domain.

6. The method of claim 5 wherein the private routing address includes a first portion and a second portion, wherein the first portion comprises a sequence of characters that are compatible with a public domain and are publicly routable over the public domain of the network, and the second portion comprises a different sequence of characters that are not compatible with the public domain of the network but are routable within the private domain of the network, wherein the private routable address as a whole is not routable within the public domain of the network.

7. The method of claim 1, wherein the private routing address includes a Private Top Level Domain (PTLD).

8. The method of claim 1, further comprising examining a recipient address to determine whether the recipient address is a private routing address.

9. The method of claim 1, wherein if a recipient address is not a private routing address, the method further comprises:
transmitting the electronic information to the recipient over the electronic network using a publicly routable recipient address and a sender address without modifying content in the electronic information.

10. The method of claim 1, further comprising transmitting the electronic information to the server over the network connection if the recipient address is a private routing address, wherein the electronic information is retrievable by the recipient subsequently from the server with the private routing address of the recipient.

11. The method of claim 1, further comprising:
building a distribution list of a plurality of recipients including the recipient of the electronic information, each of the plurality of recipients having a recipient private routing address; and
transmitting the encrypted electronic information, a security package for each recipient, and the distribution list to the server associated with the private domain.

12. The method of claim 11, further comprising:
distributing the security package to one or more storage locations associated with each of the recipients indicated by the distribution list; and
updating accounting and tracking information associated with the sender.

13. The method of claim 12, further transmitting from the server to the sender an acknowledgement of delivery of the electronic information.

14. The method of claim 1, further comprising the server associated with the private domain authenticating a sender of the message using the identifier of the sender.

15. The method of claim 1, further comprising:
when the recipient is determined not to be a member of the private domain, creating a temporary entry for the recipient within the database if the recipient is not found within the database to allow the recipient to receive the electronic information after obtaining software that enables the recipient to download the electronic information from the private domain, without the sender re-sending the electronic information.

16. The method of claim 1, further comprising:
associating a number of electronic information transmissions that the sender is able to send with a predetermined threshold; and
limiting the number of electronic information transmissions that the sender is able to send through the private domain to the predetermined threshold, wherein the predetermined threshold comprises a number of transmissions per a period of time.

17. The method of claim 1, wherein registering comprises:
transmitting an invitation to the sender to invite the sender to become a member of the private domain, wherein the sender is an invitee of a member or an administrator of the private domain;
receiving a request from the sender to become a member of the private domain; and
verifying one or more forms of identification associated with the sender to establish an identity of the sender.

18. The method of claim 1, wherein a new symmetric cryptographic key is generated for each new transmission of electronic information between members of the private network.

19. The method of claim 1, wherein transmitting the electronic information over the electronic network further comprises:
transmitting the electronic information with a private routing address that is routable within the private domain which is a subset of the electronic network.

20. A non-transitory computer readable storage medium that provides instructions, which when executed on a processing system, cause said processing system to perform a method comprising:
registering a sender to enable the sender to access services of a private domain in order to allow the sender to use the private domain for electronic information transmissions between members of the private domain;
receiving, at a server associated with the private domain, data from the sender indicating that the sender is initiating the transmission of electronic information in the private domain to a recipient;
determining, at the server associated with the private domain, whether the recipient is a member of the private domain by examining a record of members of the private domain;
providing to the sender, from the server associated with the private domain, a public cryptographic key associated with the recipient when the recipient is determined to be a member of the private domain;
receiving, at a server associated with the private domain, electronic information to be delivered to a recipient from the sender, the electronic information comprises at least a portion of the electronic information encrypted by a symmetric cryptographic key that is unique for the transmission of the electronic information, and wherein the electronic information further comprises a security package that contains an encrypted version of the symmetric cryptographic key, the encrypted version of the symmetric cryptographic key encrypted by the sender using the public cryptographic key of the recipient to enable the recipient to decrypt the symmetric cryptographic key and then decrypt the at least a portion of the encrypted electronic information; and
transmitting the electronic information, with the security package, over an electronic network to the recipient.

* * * * *